(12) United States Patent
Wright et al.

(10) Patent No.: US 6,973,589 B2
(45) Date of Patent: Dec. 6, 2005

(54) ELECTRONIC COMMUNICATIONS IN INTELLIGENT ELECTRONIC DEVICES

(75) Inventors: Peter Michael Wright, Abbotsford (CA); Henry W. Painchaud, Vernon Hills, IL (US); David Weinbach, Racine, WI (US)

(73) Assignee: Cooper Industries, Inc., Houston, TX (US)

( * ) Notice: Subject to any disclaimer, the term of this patent is extended or adjusted under 35 U.S.C. 154(b) by 552 days.

(21) Appl. No.: 09/835,398

(22) Filed: Apr. 17, 2001

(65) Prior Publication Data

US 2002/0046246 A1 Apr. 18, 2002

Related U.S. Application Data

(60) Provisional application No. 60/198,376, filed on Apr. 19, 2000.

(51) Int. Cl.[7] .............................................. G06F 11/00
(52) U.S. Cl. ............................. 714/14; 714/15; 714/22
(58) Field of Search ............................. 714/14, 15, 22

(56) References Cited

U.S. PATENT DOCUMENTS

| | | | |
|---|---|---|---|
| 5,283,905 A | * | 2/1994 | Saadeh et al. ............... 713/324 |
| 5,381,554 A | * | 1/1995 | Langer et al. ................ 714/14 |
| 5,428,553 A | | 6/1995 | Chiba et al. |
| 5,461,488 A | * | 10/1995 | Witek ........................ 358/402 |
| 5,661,463 A | | 8/1997 | Letchak et al. |
| 5,680,324 A | | 10/1997 | Schweitzer, III et al. |
| 5,687,308 A | * | 11/1997 | Jardine et al. ................. 714/4 |
| 5,715,393 A | | 2/1998 | Naugle |

(Continued)

FOREIGN PATENT DOCUMENTS

| | | | |
|---|---|---|---|
| EP | 0 942 612 | | 9/1999 |
| EP | 1294127 A1 | * | 3/2003 ........... H04L 12/24 |
| JP | 2002-132599 A1 | * | 10/2000 ........... G06F 13/00 |

OTHER PUBLICATIONS

Microsoft, Microsoft Computer Dictionary, 4th Ed., p. 291.*
Computer Applications in Power; vol. II No. 3; Jul. 1998; IEEE Computer Applications in Power; pp. 14-22.

(Continued)

*Primary Examiner*—Nadeem Iqbal
*Assistant Examiner*—Timothy M. Bonura
(74) *Attorney, Agent, or Firm*—Fish & Richardson P.C.

(57) ABSTRACT

An intelligent electronic device (IED) is connected to interact with a power system to provide protection, control, and/or monitoring capabilities for the power system. The device includes a power system interface circuit for communicating with the power system and a processor coupled to the power system interface circuit. The device further includes memory storing software instructions performed by the processor for receiving electronic mail from a remote system through a communication link and for automatically transmitting electronic mail to the remote system through the communication link. The electronic mail may include information relating to operation of the power system or to operation of the intelligent electronic device.

52 Claims, 3 Drawing Sheets

U.S. PATENT DOCUMENTS

| | | | | |
|---|---|---|---|---|
| 5,928,368 A | * | 7/1999 | Jardine et al. | 714/22 |
| 6,161,198 A | * | 12/2000 | Hill et al. | 714/15 |
| 6,163,849 A | * | 12/2000 | Nouri et al. | 713/324 |
| 6,271,759 B1 | | 8/2001 | Weinbach et al. | |
| 6,298,449 B1 | * | 10/2001 | Carter | 713/340 |
| 6,519,720 B1 | * | 2/2003 | Mores | 714/43 |
| 6,594,771 B1 | * | 7/2003 | Koerber et al. | 713/330 |
| 6,714,977 B1 | * | 3/2004 | Fowler et al. | 709/224 |
| 6,738,781 B1 | * | 5/2004 | Mustoe et al. | 707/102 |

OTHER PUBLICATIONS

Substation Automation Communications; Sep. 12, 1997, http://www.ucaforum.org/projects/subdemo/sow7.htm.

Schweitzer Engineering Laboratories, "SEL-351S Protection and Breaker Control Relay—Optimize Distribution Protection with Breaker Control, Monitoring and Fault Locating", pp. 8-10, www.selinc.com.

Cooper Power Systems, "Putting a New Face on Relay Protection", pp. 1-8, Cooper Industries, Inc. 1999; www.cooperpower.com.

Office Action issued on Sep. 1, 2004 in a Canadian counterpart application; Application No. 2,406,791; Examiner: N. Zelem.

Office Action issued on Feb. 4, 2005 in a China counterpart application; Application No. 01811138.6.

* cited by examiner

ELECTRONIC COMMUNICATIONS IN INTELLIGENT ELECTRONIC DEVICES

CROSS REFERENCE TO RELATED APPLICATIONS

This application claims benefit of U.S. Provisional Application No. 60/198,376, filed Apr. 19, 2000.

TECHNICAL FIELD

This invention relates to electronic communications in intelligent electronic devices used in power systems.

BACKGROUND

An intelligent electronic device (IED) is any microprocessor-controlled equipment connected to interact with a power system by, for example, monitoring, controlling, and/or protecting circuits, apparatus, and/or equipment used for the distribution or dissemination of electric power in the power system.

SUMMARY

In one general aspect, an intelligent electronic device (IED) is connected to interact with a power system to provide protection, control, and/or monitoring capabilities for the power system. The device includes a power system interface circuit for communicating with the power system and a processor coupled to the power system interface circuit. The device further includes memory storing software instructions performed by the processor for receiving electronic mail from a remote system through a communication link and/or for automatically transmitting electronic mail to the remote system through the communication link.

Implementations may include one or more of the following features. For example, the IED may transmit or receive electronic mail including information relating to operation of the power system and/or the IED. The memory may store software instructions performed by the processor for receiving input from the power system interface circuit relating to operation of the power system. The memory may store software instructions performed by the processor for sending output to the power system interface circuit to operate a fault protection device when input received from the power system interface circuit indicates a fault event in the power system.

The device may also include a second memory storing temporary data to be used by the processor for transmitting and receiving electronic mail to and from the remote system. The second memory may store status reports relating to the power system, measurement data relating to the power system, event records relating to the power system, status change data relating to the power system, and documentation files relating to the power system. The memory may store temporary data to be used by the processor for transmitting and receiving electronic mail to and from the remote system. The memory may store software instructions performed by the processor for validating the remote system before receiving electronic mail from the remote system. The memory may store software instructions performed by the processor for interpreting electronic mail that includes settings, configuration, operating code, requests for information, or one or more commands.

The memory may store software instructions performed by the processor for receiving within the electronic mail a request for information relating to operation of the power system. In this case, the memory may further store software instructions performed by the processor for interpreting a request for information that includes one or more of: a request for current configuration of the device, a request for a data file of the measurements for the last time period, a request for a snapshot of the last operation of the device, and a request to change a single operating parameter of the power system.

The memory may store software instructions performed by the processor for receiving within the electronic mail a command. In this case, the memory may also store software instructions performed by the processor (i) for validating the command, (ii) for interpreting the command, (iii) for sending confirmation to the remote system of the validated command, (iv) for receiving assurance of the command from the remote system, and (v) for executing the command if the assurance is received.

The memory may store software instructions performed by the processor for encoding at least a portion of the electronic mail as ASCII text and for interpreting at least a portion of the electronic mail as ASCII text. The memory may store software instructions performed by the processor for encoding at least a portion of the electronic mail as HTML-formatted text and for interpreting at least a portion of the electronic mail as HTML-formatted text. The memory may store software instructions performed by the processor for encoding at least a portion of the electronic mail as XML-formatted text and for interpreting at least a portion of the electronic mail as XML-formatted text.

The memory may store software instructions performed by the processor (i) for encoding data in binary format, and (ii) for attaching the encoded data to electronic mail that will be transmitted. Accordingly, the memory may also store software instructions performed by the processor for interpreting data encoded in a binary format as an attachment in a received electronic mail. In a further implementation, the memory may store software instructions performed by the processor (i) for encoding data in MIME, (ii) for attaching the encoded data to electronic mail that will be transmitted. Similarly, the memory may further store software instructions performed by the processor for interpreting data encoded in MIME as an attachment in a received electronic mail.

The memory may store software instructions performed by the processor for formatting one or more of: status changes, new data, alarms, event records, oscillographic records, and documentation files within electronic mail that is transmitted. The memory may store software instructions performed by the processor for transmitting electronic mail to the remote system including a distribution list of remote users. The memory may store software instructions performed by the processor for transmitting instant messages to the remote system.

The remote system may include one or more of: a computer, a cellular telephone, a personal digital assistant, a pager, and a television system.

In another general aspect, an intelligent electronic device (IED) is connected to interact with a power system to provide protection, control, and/or monitoring capabilities for the power system. The device includes a power system interface circuit for communicating with the power system and a processor coupled to the power system interface circuit. The device further includes memory storing software instructions performed by the processor for receiving instant messages from a remote system through a communication link and/or for automatically transmitting instant messages to the remote system through the communication link.

Aspects of the techniques and systems can include one or more of the following advantages. The intelligent electronic device (IED) can initiate and receive e-mail or instant messages across the Internet to and from a remote system such as, for example, a remote user's personal computer (PC), a remote user's pager, a remote user's terminal and/or process monitor, a remote user's mailbox, or message boards that include one or more remote users. The IED may transmit or receive e-mail or instant messages that include data or information relating to the power system or to the IED. Such data includes: sequence of event data, oscillographic data, status reports, measurement data, event records, status change data, documentation files, settings, configuration, operating code, requests for information, commands, statistical data, maintenance records, and power quality data. In this way, the data or information can be available to individuals automatically, simultaneously, and instantaneously as security access and network availability allows.

Upon receipt of an e-mail message (or an instant message), a user at the remote system or at the IED can make comments and then generate and send another e-mail message (or instant message), which may include these comments as well as the original e-mail message (or instant message), to thereby build a history of comments and suggestions.

E-mail messages from the IED can be posted to a newsgroup to allow many individuals to review information about operation of the IED or the power system upon request. Newsgroup members can review a problem associated with the IED or the power system by reviewing the e-mail posting. The newsgroup members then can use available simulators to reproduce the problem, and offer solutions to fix the problem. This allows a remote user to diagnose a situation within the IED or the power system from a remote part of the world (for example, at electrical utility transmission and distribution stations, at drilling rigs, and at island republics) before, while, or after site maintenance people are sent to investigate the situation.

E-mail (or instant messages) also can be solicited by the user at the remote system or at the IED in order to maintain a central control program, get status updates from the IED, or note local changes of configuration settings of the IED as they are being issued by others.

The remote user may perform periodic setting adjustments, profile changes, or programming updates in an automatic and secure manner, without the burden of a remote multi-step adjustment. The IED permits adjustments to be made from a remote system using e-mail or instant messaging communication capabilities designed within the IED.

Other features and advantages will be apparent from the description, the drawings, and the claims.

DESCRIPTION OF DRAWINGS

Like reference symbols in the various drawings indicate like elements.

DETAILED DESCRIPTION

In current IED communication systems, the communication of information relating to operation of the power system and/or the IED between the IED and a remote system typically requires one or more dedicated devices. Such information may include, for example, failure messages, configuration data, sequence of event (SOE) records, and contact output data. The one or more dedicated devices may include, for example, a remote terminal unit (RTU), a supervisory control and data acquisition system (SCADA), or a local area network (LAN). The one or more dedicated devices move the information to a single user or endpoint (for example, a network database, an actual specific customer, or a data log file). In general, this information may be moved to other pertinent individuals within a user's firm using an additional process, other dedicated devices, and human intervention.

In current IED communication systems, IEDs typically only send single event messages or files to local facility equipment. In addition, and in general, the IED's configuration or main program can be altered only through direct human intervention, such as, for example, through local physical communications, through programming ports, or through the replacement of internal components.

Furthermore, industry communication standards presently do not outline a system for accessing some important resources, such as user manuals and application-specific files, because those resources are generally not currently stored within the IED due to the difficulty in transmission of those resources and in obtaining remote access to those resources.

When using IEDs such as protection relays or other electrical equipment or devices, power system operation is improved when the IED is designed within a communication system to have communication capabilities such as e-mail, instant messaging, chat, and newsgroup capabilities. Furthermore, by expanding the design of the IED to include these communication capabilities, the IED communication system permits resources to be shared by designated users automatically and simultaneously.

Because the IED is provided with one or more of these communication capabilities, the IED communication system is able to transfer timely and accurate information between the IED and an external or remote system. Transferred information may pertain to operation of the power system and/or operation of the IED. Such information may include, for example, failure messages, configuration data, sequence of event (SOE) records, oscillographic data, status reports, measurement data, event records, status change data, documentation files, settings, operating code, requests for information, commands, statistical data, maintenance records, and power quality data. In this way, the data or information can be available to individuals automatically, simultaneously, and instantaneously as security access and Internet availability allows. Such an IED communication system provides system operators with the ability to disseminate the IED data quickly to all interested and involved authorized parties without the need for personal intervention. Moreover, the IED communication system provides all interested and involved authorized parties with the ability to control the IED.

Figure 1:
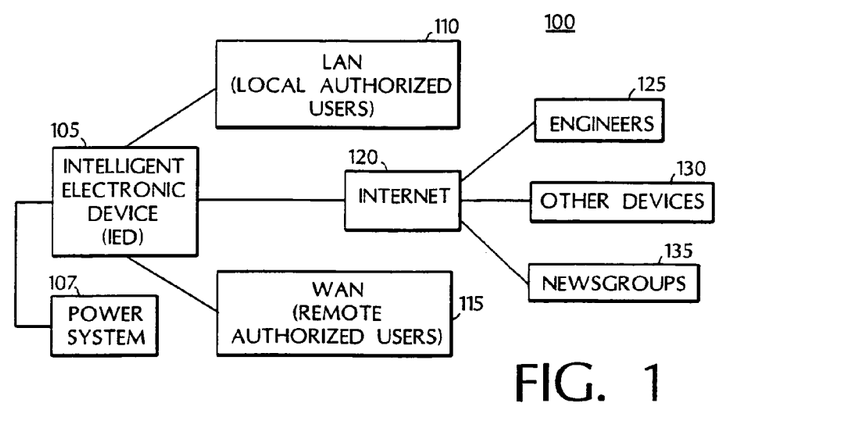
FIG. 1 is a block diagram showing a communications system that includes an intelligent electronic device (IED).

Referring to FIG. 1, an IED communications system 100 includes one or more IEDs 105 coupled to a power system 107. The IEDs 105 are arranged to operate within or in concert with one or more systems external to or remote from the IED 105 through one or more communications links.

Communications links may include one or more local area networks (LANs) 110, one or more wide area networks (WANs) 115, and the Internet 120. The communications link between the IED 105 and a remote system typically provides a direct or indirect communication path between the IED 105 and the remote system, irrespective of physical separation. Examples of other communications links include the World Wide Web, analog or digital wired and wireless telephone networks (for example, PSTN, ISDN, or xDSL), radio, television, cable, satellite, and/or any other delivery mechanism for carrying data. The communications link may include communication pathways that enable communications through a delivery network. Each of the communication pathways may include, for example, a wired, wireless, cable or satellite communication pathway.

Through network protocols (for example, e-mail protocols, instant messaging protocols, proprietary protocols, or other communication protocols) and without the use of direct human intervention, the IED 105 can download or upload information in an e-mail or an instant message to or from one or more remote systems and/or remote users. Examples of remote systems or users include engineers at remote computer systems 125, one or more other devices 130, or one or more newsgroups 135. The one or more other device 130 may include any device capable of receiving and/or transmitting e-mail or instant messages. Examples of such devices include computers (personal, desktop, or portable), cellular or land-based telephones, personal digital assistants, networked television systems, pagers, or workstations. Optionally, any authorized user can send information to the IED 105 while using an appropriate encryption algorithm either locally through the LAN 110 or remotely through the WAN 115. Since all information transmissions are processed through servers, any message can be retrieved as required by the user.

To perform these communications, the IED 105 may include one or more local devices and/or local controllers. The local device is generally capable of executing instructions under the command of the local controller. The local device is connected to the local controller by a wired or wireless data pathway capable of delivering data. The local device and local controller may include one or more hardware components and/or software components. An example of a local device is a general-purpose computer (for example, a personal computer) capable of responding to and executing instructions in a defined manner. Other examples include a special-purpose computer, a workstation, a server, a device, a component, other equipment, or some combination capable of responding to and executing instructions. An example of local controller is a software application loaded on the local device for commanding and directing communications enabled by the local device. Other examples include a program, a piece of code, an instruction, a device, a computer, a computer system, or any combination, for independently or collectively instructing the local device to interact and operate as described. The local controller may be embodied permanently or temporarily in any type of machine, component, equipment, storage medium, or propagated signal capable of providing instructions to the local device.

Figure 2:
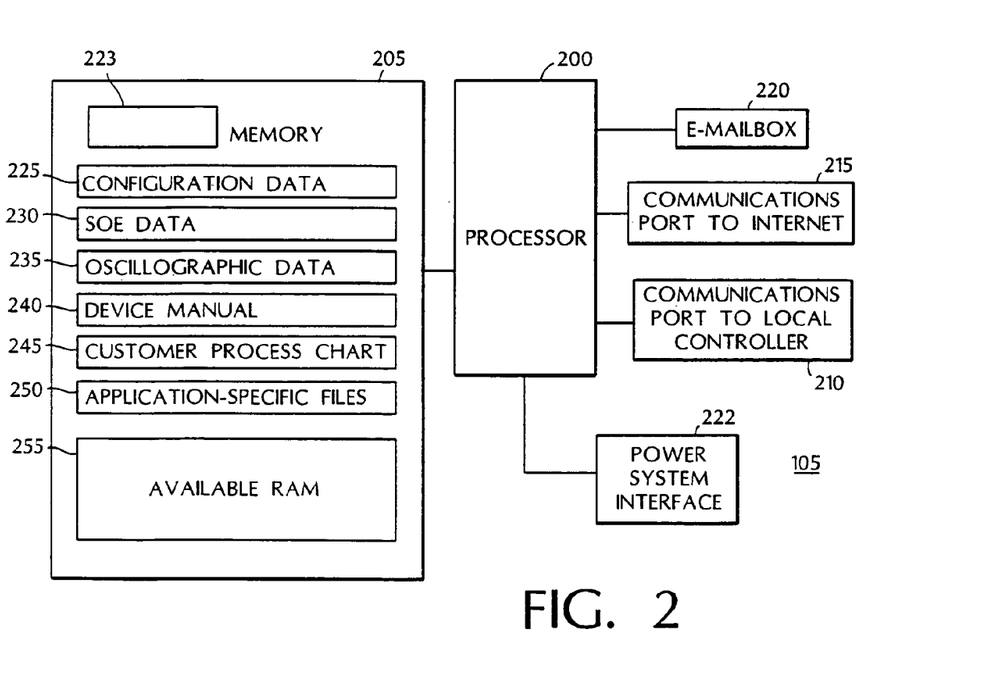
FIGS. 2 and 3 are block diagrams of the IED used in the communications system of FIG. 1.

Referring also to FIG. 2, in one implementation, the IED 105 includes a processor 200, memory 205, a communications port 210 to the local controller, and a communications port 215 to the Internet. The IED 105 may include an electronic mailbox 220. The IED 105 also includes a power system interface circuit 222 that communicates with the power system 107 to monitor, control, and/or protect circuits, apparatus, and/or equipment used for the distribution and/or dissemination of electric power in the power system 107. The circuit 222 may communicate with the processor 200. In some implementations, the circuit 222 includes its own processing capabilities. In other implementations, processing capacity needed by the circuit 222 is provided by the processor 200.

The memory 205 stores data and programs 223 such as an operating system and one or more application programs. Examples of application programs include database programs or graphics programs for controlling, monitoring, and protecting equipment used in the power system. Application programs also include one or more protocols that are used to control communication with the external systems 125, 130, or 135. Some commonly used protocols for sending and receiving e-mail include Transmission Control Protocol (TCP), Internet Protocol (IP), Hypertext Transfer Protocol (HTTP), and File Transfer Protocol (FTP). Each protocol has defined sets of rules to use with corresponding programs elsewhere on the Internet. Additionally, a popular protocol for sending e-mail is Simple Mail Transfer Protocol (SMTP) and a popular protocol for receiving e-mail is Post Office Protocol version 3 (POP3), each of which may be implemented by the IED 105 to send and receive e-mail.

The memory 205 may store configuration data 225 that describes how the devices in the power system 107 are configured. The memory may also store sequence of event (SOE) data 230 that provides a record of events that occur during operation of the power system 107. The memory 205 may also store oscillographic data 235 that provides graphic data relating to operation of particular devices within the power system 107. Furthermore, the memory 205 may store an IED instruction or operation manual 240 that describes the operation of the IED 105. The memory 205 may store one or more customer process charts 245 or one-line diagrams showing the circuit arrangement of one or more devices within the power system 107. Moreover, the memory 205 may store other application-specific files 250 for use by the processor 200. The memory typically also includes unused or available space 255.

To provide e-mail communication capability as an e-mail client, the memory 205 may store all data needed for operation as an e-mail client.

To provide e-mail communication capability as an e-mail server, the electronic mailbox 220 may be used as a temporary storage area for incoming and outgoing e-mail. Thus, in addition to storing information such as configuration data 225 and application-specific files 250 within memory 205, the IED 105 may store information within the electronic mailbox 220, thus permitting the IED to interact with other data file types. The information stored within the mailbox 220 includes, for example, status reports, measurement data, event records, status change data, and user supplied text and graphics documentation files. The information within the mailbox 220 may be accessed by external mail clients. The mailbox 220 may be accessed using POP3 or other protocols.

Any e-mail transmitted from the IED 105 may be at least partially encoded as ASCII text, as HTML-formatted text, or as XML-formatted text. The IED 105 may interpret at least a portion of a received e-mail as ASCII text, as HTML-formatted text, or as XML-formatted text. Optionally, an e-mail transmitted to and from the IED 105 may include non-text files, such as data or program files, graphic images or files, and sound files, as attachments sent in binary streams. The mailbox 220 may be implemented as part of memory 205.

The processor 200 executes instructions in response to commands from the local controller. In one implementation, the local controller includes one or more application programs installed on the memory 205 of the IED 105. In another implementation, the local controller includes application programs externally stored in and performed by one or more devices external to the IED 105.

Figure 3:
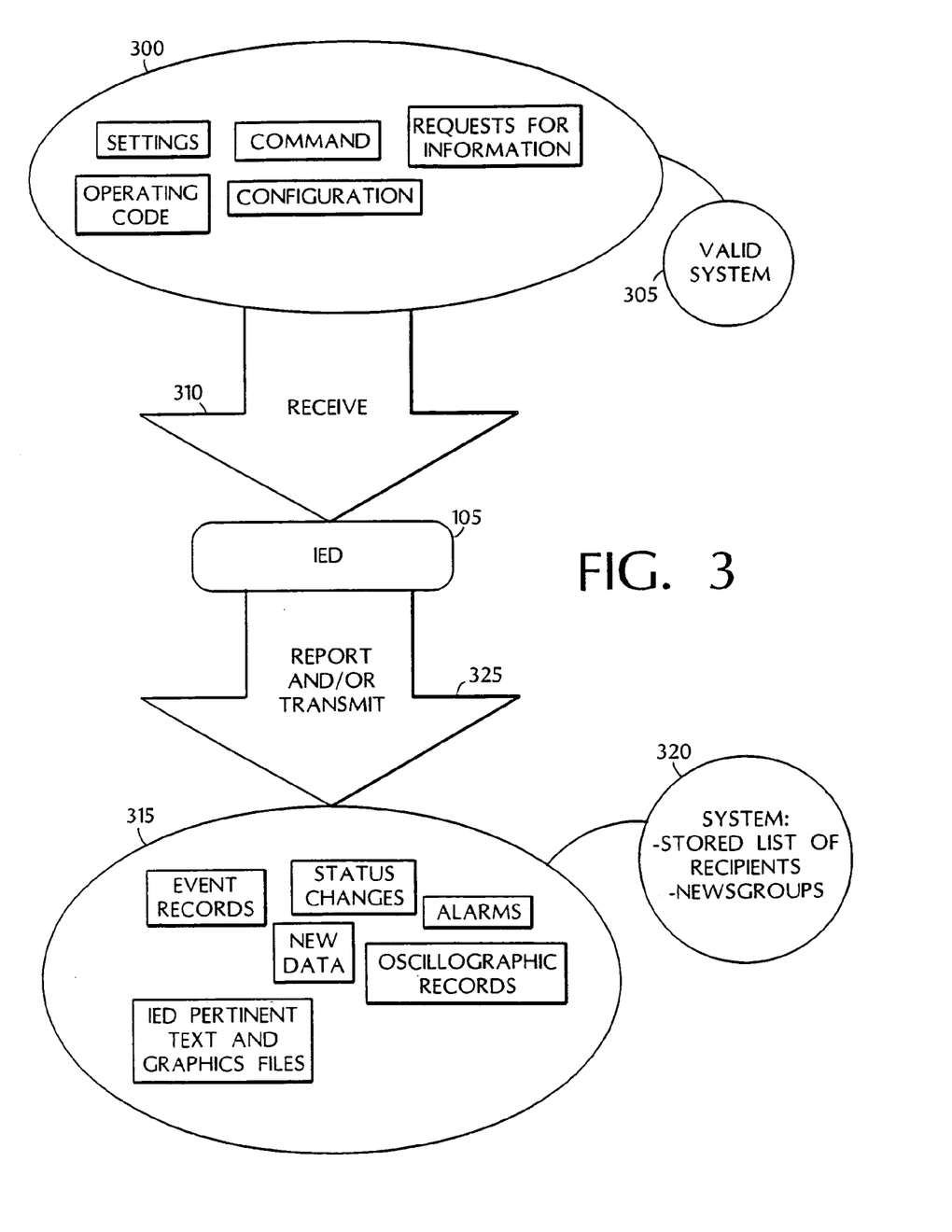

Referring also to FIG. 3, using the communications system 100, the IED 105 may receive information 300 from a remote system 305 (such as, for example, an engineer at a remote system 125, another device 130, or a newsgroup 135) using a communications link 310 (such as LAN 110, Internet 120, or WAN 115). Additionally, the IED 105 may report or transmit information 315 to a remote system 320 (such as, for example, an engineer 125, another device 130, or a newsgroup 135) using a communications link 325 (such as LAN 110, Internet 120, or WAN 115).

The IED 105 may receive information 300, such as settings, configuration, operating code, requests for information, or one or more commands, through an e-mail messaging system using a standard protocol. The IED 105 may take appropriate action in response to such information 300.

The IED 105 may be configured to accept information 300 (such as requests or commands) that comes from a valid system 305 or a trusted requestor whose e-mail is stored on the IED 105. Requests for information from the valid system 305 may include requests for the current configuration of the IED 105, requests for a data file of the measurements for the last time period, or requests for a snapshot of the last operation of the IED 105. Commands from the valid system 305 also may include a request to change a single operating parameter.

In any case, a command or any other type of information 300 may be formatted as an attachment to an e-mail message. The e-mail attachment may contain a configuration file that causes the IED 105 to simultaneously change several operating parameters, or it may contain a command that causes the IED 105 to perform a certain function at a certain time.

When the IED 105 receives an e-mail command, the protocol used by the IED 105 insures the e-mail command's validity and checks for corruption by using a checksum or other known techniques. Once the e-mail command is validated by the IED 105, the protocol used by the IED 105 processes the command, and then optionally replies to the e-mail sender with a confirmation message restating the commands it understood, and noting any errors or warnings.

Figure 4:
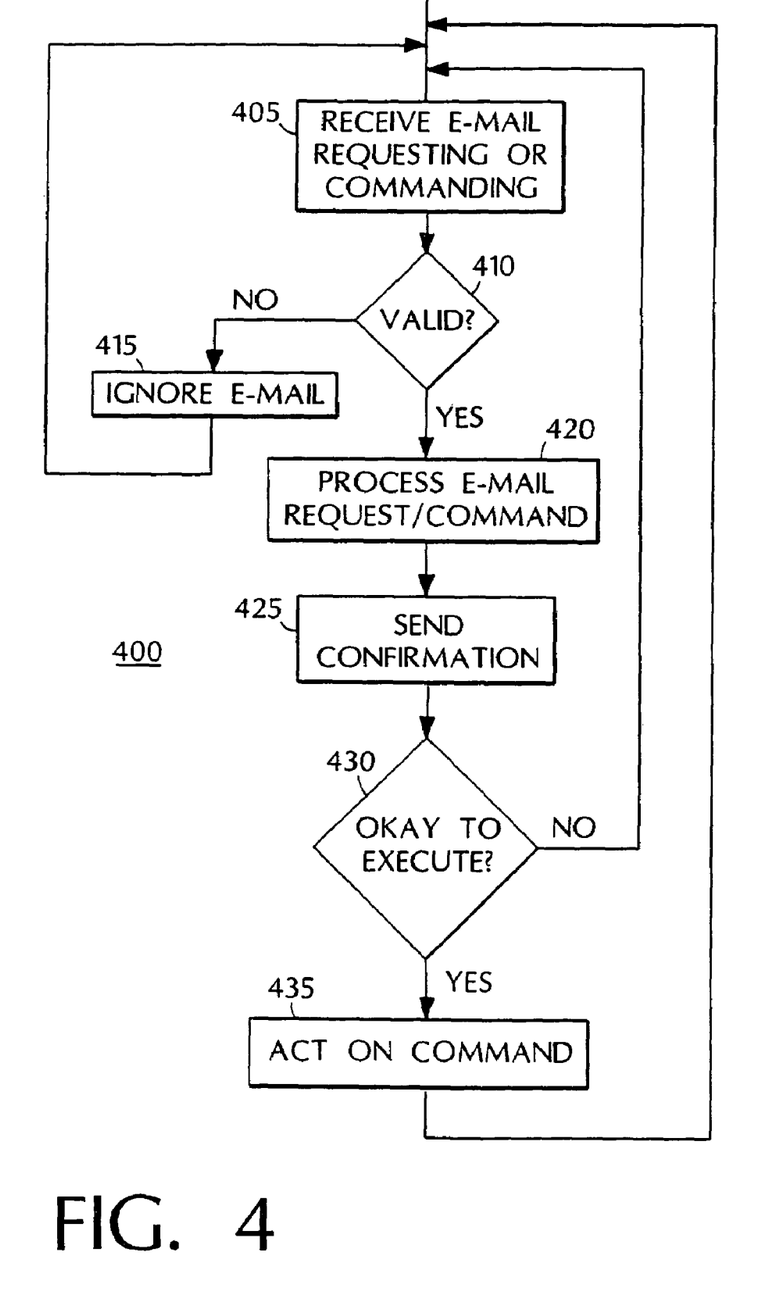
FIG. 4 is a flow chart of a procedure performed by the IED of FIGS. 2 and 3.

Referring also to FIG. 4, in one implementation, the IED 105 (through its e-mail protocol) performs a process 400 for receiving an e-mail command. Initially, the IED 105 receives the command (step 405). The IED 105 then checks the command for corruption to insure its validity (step 410). If the command is not valid (step 410), the IED 105 ignores the command (step 415) and awaits further instruction. If the command is valid (step 410), the IED 105 processes the command (step 420). The IED 106 sends a confirmation e-mail message with a unique confirmation code to the sender of the command (step 425). After reviewing the confirmation e-mail message for accuracy, the command requester sends an execute e-mail message containing the confirmation code back to the IED 105 if the confirmation e-mail is accurate. The IED 105 then determines if an execute command has been received (step 430). If the execute command is not received (step 430), the IED 105 ignores the command and awaits further instruction. If the execute command is received (step 430), then the IED 105 performs or acts on the command (step 435).

The process 400 insures that the IED 105 only acts on commands that have been validated. This provides security by insuring that the IED 105 can both send and receive messages at the trusted e-mail address, since it may be possible to make an e-mail appear as if it came from a trusted requestor when in fact it did not.

Because the IED 105 may store information within the mailbox 220 and other information within the memory 205, the IED 105 may transmit information 315 to a remote system 320 based on this stored information in the IED 105. Furthermore, the IED 105 may distribute a transmitted e-mail message to lists of people as well as to an individual. A shared distribution list can be managed by using an e-mail reflector. The IED 105 may transmit information 315 to and receive information from a remote system 320 using an instant messaging system.

The IED 105 may report and/or transmit, for example, status changes, new data, alarms, event records, oscillographic records, and IED pertinent text and graphics documentation files by sending e-mail messages to a stored list of recipients using a standard protocol. The IED 105 may report and/or transmit, for example, status changes, new data, alarms, event records, oscillographic records, and IED pertinent text and graphics documentation files by sending e-mail messages to newsgroup(s) for group viewing using a protocol such as a Network News Transfer Protocol (NNTP).

For example, the IED 105 can send an alarm e-mail message to those on a mailing list or newsgroup or to engineers at a remote system or to any other devices. The IED 105 can send an alarm instant message to those users at a remote system who are currently online. The IED 105 can attach pertinent helpful diagrams and text messages to the e-mail message or to the instant message so that a recipient (such as a diagnostic engineer) will have sufficient information to address the alarm situation. As another example, the IED 105 can send a snapshot of event data from a time period surrounding an event captured by the IED 105. As a further example, the IED 105 can periodically send a log of power consumption during a preceding period. The IED 105 can send an image file that graphically conveys a change in state of either the IED 1 05 or an external device to which the IED is connected.

The IED 105 may be configured to store within memory 205 graphic representations of dynamic or static events that indicate a state of the power system or the IED. Such graphic representations include, for example, the IED's device manual, or a customer process chart (that is, a one-line diagram). Moreover, because the graphic representations may be stored within the IED's memory 205, this information can be formatted as an attached binary file (or attachment) or as an embedded graphic image or file to an e-mail message or to an instant message for transmission to and from the IED 105. Such files may be first encoded in one of a variety of encoding schemes, such as, for example, MIME or uuencode. Any user who receives the attachment decodes the file with the same scheme that was used to encode the file. This decoding is performed automatically by most e-mail packages.

Furthermore, the IED 105 may use publicly available authentication protocols to verify the identity of users or systems before granting access to information stored within the IED. An example of such a publicly available protocol is Kurberos, a protocol accepted by the Internet Engineering Task Force (IETF).

Other implementations are within the scope of the following claims. The e-mail or postings to newsgroups may include attachments of appropriate sections of the relay's manual or a pictorial of the relay. This attached data may be stored in the relay prior to an event. The e-mail also may include HTML (Hyper-Text Markup Language) files, XML files, or hyperlinks to newsgroups.

What is claimed is:

1. An intelligent electronic device connected to interact with a power system, the device comprising:
   a power system interface circuit for communicating with the power system;
   a processor coupled to the power system interface circuit; and
   memory storing software instructions performed by the processor for:
   receiving electronic mail from a remote system through a communication link,
   automatically transmitting electronic mail to the remote system through the communication link; and
   validating the remote system before accepting electronic mail from the remote system.

2. The device of claim 1 in which the memory stores software instructions performed by the processor for encoding at least a portion of the electronic mail as ASCII text and for interpreting at least a portion of the electronic mail as ASCII text.

3. The device of claim 1 in which the memory stores software instructions performed by the processor for encoding at least a portion of the electronic mail as HTML-formatted text and for interpreting at least a portion of the electronic mail as HTML-formatted text.

4. The device of claim 1 in which the memory stores software instructions performed by the processor for encoding at least a portion of the electronic mail as XML-formatted text and for interpreting at least a portion of the electronic mail as XML-formatted text.

5. The device of claim 1 in which the memory stores software instructions performed by the processor (i) for encoding data in binary format, and (ii) for attaching the encoded data to electronic mail that will be transmitted.

6. The device of claim 1 in which the memory stores software instructions performed by the processor for interpreting data encoded in a binary format as an attachment in a received electronic mail.

7. The device of claim 1 in which the memory stores software instructions performed by the processor (i) for encoding data in MIME, (ii) for attaching the encoded data to electronic mail that will be transmitted.

8. The device of claim 1 in which the memory stores software instructions performed by the processor for interpreting data encoded in MIME as an attachment in a received electronic mail.

9. The device of claim 1 in which the memory stores software instructions performed by the processor for formatting one or more of: status changes, new data, alarms, event records, oscillographic records, and documentation files within electronic mail that is transmitted.

10. The device of claim 1 in which the memory stores software instructions performed by the processor for transmitting electronic mail to the remote system including a distribution list of remote users.

11. The device of claim 1 in which the memory stores instructions performed by the processor for receiving instant messages from a remote system through a communication link and for automatically transmitting instant messages to the remote system through the communication link.

12. An apparatus for interacting with a power system, the apparatus comprising:
   an intelligent electronic device connected to the power system; and
   a system remote from the intelligent electronic device and connected to the intelligent electronic device through a communication link;
   in which the intelligent electronic device comprises:
   a power system interface circuit in communication with the power system,
   a processor, and
   memory storing software instructions performed by the processor for receiving electronic mail from the remote system through the communication link, for transmitting electronic mail to the remote system through the communication link, and for validating the remote system before accepting electronic mail from the remote system.

13. The apparatus of claim 12 in which the memory stores software instructions performed by the processor for receiving within the electronic mail a request for information relating to operation of the power system.

14. The apparatus of claim 13 in which the memory stores software instructions performed by the processor for interpreting a request for information that includes one or more of: a request for current configuration of the power system or the device, a request for a data file of the measurements for the last time period, a request for a snapshot of the last operation of the power system or the device, and a request to change a single operating parameter of the power system or the device.

15. The apparatus of claim 12 in which the memory stores software instructions performed by the processor for receiving within the electronic mail a command.

16. The apparatus of claim 15 in which the memory stores software instructions performed by the processor (i) for validating the command, (ii) for interpreting the command, (iii) for sending confirmation to the remote system of the validated command, (iv) for receiving assurance of the command from the remote system, and (v) for executing the command if the assurance is received.

17. The apparatus of claim 12 in which the memory stores software instructions performed by the processor for encoding at least a portion of the electronic mail as ASCII text and for interpreting at least a portion of the electronic mail as ASCII text.

18. The apparatus of claim 12 in which the memory stores software instructions performed by the processor for encoding at least a portion of the electronic mail as HTML-formatted text and for interpreting at least a portion of the electronic mail as HTML-formatted text.

19. The apparatus of claim 12 in which the memory stores software instructions performed by the processor for encoding at least a portion of the electronic mail as XML-formatted text and for interpreting at least a portion of the electronic mail as XML-formatted text.

20. The apparatus of claim 12 in which the memory stores software instructions performed by the processor (i) for encoding data in binary format, and (ii) for attaching the encoded data to electronic mail that will be transmitted.

21. The apparatus of claim 12 in which the memory stores software instructions performed by the processor for interpreting data encoded in a binary format as an attachment in a received electronic mail.

22. The apparatus of claim 12 in which the memory stores software instructions performed by the processor (i) for encoding data in MIME, (ii) for attaching the encoded data to electronic mail that will be transmitted.

23. The apparatus of claim 12 in which the memory stores software instructions performed by the processor for interpreting data encoded in MIME as an attachment in a received electronic mail.

24. The apparatus of claim 12 in which the memory stores software instructions performed by the processor for formatting one or more of: status changes, new data, alarms, event records, oscillographic records, and documentation files within electronic mail that is transmitted.

25. An intelligent electronic device connected to interact with a power system, the device comprising:
  a power system interface circuit for communicating with power system components used for the distribution or dissemination of electric power in the power system;
  a processor coupled to the power system interface circuit; and
  memory storing software instructions performed by the processor for receiving an instant message from a remote system through a communication link and for automatically transmitting an instant message to the remote system through the communication link.

26. An intelligent electronic device connected to interact with a power system, the device comprising:
  a power system interface circuit for communicating with power system components used for the distribution or dissemination of electric power in the power system;
  a processor coupled to the power system interface circuit; and
  memory storing software instructions performed by the processor for receiving electronic mail from a remote system through a communication link.

27. The device of claim 26 in which the electronic mail includes information relating to operation of one or more of: the power system and the device.

28. The device of claim 26 in which the memory stores software instructions performed by the processor for receiving input from the power system interface circuit relating to operation of the power system.

29. The device of claim 26 in which the memory stores software instructions performed by the processor for sending output to the power system interface circuit to operate a fault protection device when input received from the power system interface circuit indicates a fault event in the power system.

30. The device of claim 26 further comprising a second memory storing temporary data to be used by the processor for receiving electronic mail to and from the remote system.

31. The device of claim 30 in which the second memory stores temporary data relating to the power system or to the intelligent electronic device, the temporary data including one or more of: status reports, measurement data, event records, status change data, and documentation files.

32. The device of claim 26 in which the memory stores software instructions performed by the processor for validating the remote system before accepting electronic mail from the remote system.

33. The device of claim 26 in which the memory stores software instructions performed by the processor for interpreting electronic mail that includes one or more of: settings, configuration, operating code, requests for information, and one or more commands.

34. The device of claim 26 in which the memory stores software instructions performed by the processor for receiving within the electronic mail a request for information relating to operation of one or more of the power system and the device.

35. The device of claim 34 in which the memory stores software instructions performed by the processor for interpreting a request for information that includes one or more of: a request for current configuration of the power system or the device, a request for a data file of the measurements for the last time period, a request for a snapshot of the last operation of the power system or the device, and a request to change a single operating parameter of the power system or the device.

36. The device of claim 26 in which the memory stores software instructions performed by the processor for receiving within the electronic mail a command.

37. The device of claim 36 in which the memory stores software instructions performed by the processor (i) for validating the command, (ii) for interpreting the command, (iii) for sending confirmation to the remote system of the validated command, (iv) for receiving assurance of the command from the remote system, and (v) for executing the command if the assurance is received.

38. The device of claim 26 in which the remote system comprises one or more of a computer, a cellular telephone, a personal digital assistant, a pager, and a television system.

39. The device of claim 26 in which the memory stores temporary data to be used by the processor for receiving electronic mail to and from the remote system.

40. The device of claim 39 in which the memory stores temporary data relating to the power system or to the device, the temporary data including one or more of status reports, measurement data, event records, status change data, and documentation files.

41. An intelligent electronic device connected to interact with a power system, the device comprising:
  a power system interface circuit for communicating with power system components used for the distribution or dissemination of electric power in the power system;
  a processor coupled to the power system interface circuit; and
  memory storing software instructions performed by the processor for automatically transmitting electronic mail to a remote system through a communication link.

42. The device of claim 41 in which the electronic mail includes information relating to operation of one or more of: the power system and the intelligent electronic device.

43. The device of claim 41 in which the memory stores software instructions performed by the processor for receiving input from the power system interface circuit relating to operation of the power system.

44. The device of claim 41 in which the memory stores software instructions performed by the processor for sending output to the power system interface circuit to operate a fault protection device when input received from the power system interface circuit indicates a fault event in the power system.

45. The device of claim 41 in which the intelligent electronic device comprises a second memory storing temporary data to be used by the processor for transmitting electronic mail to and from the remote system.

46. The device of claim 45 in which the second memory stores temporary data relating to the power system or to the intelligent electronic device, the temporary data including one or more of: status reports, measurement data, event records, status change data, and documentation files.

47. The device of claim 41 in which the memory stores software instructions performed by the processor for interpreting electronic mail that includes settings, configuration, operating code, requests for information, or one or more commands.

48. The device of claim 41 in which the memory stores software instructions performed by the processor for transmitting electronic mail to the remote system including a distribution list of remote users.

49. The device of claim 41 in which the remote system comprises one or more of a computer, a cellular telephone, a personal digital assistant, a pager, and a television system.

50. A computer readable medium having embodied thereon a computer program for processing by an intelligent electronic device connected to interact with components of a power system, the computer program comprising:

a first code segment to receive input from power system components used for the distribution or dissemination of electric power in the power system, the input relating to operation of the power system;

a second code segment to send output to the power system to operate a fault protection device when input received from the power system indicates a fault event in the power system; and a third code segment to receive electronic mail from a remote system through a communication link.

51. The computer readable medium of claim 50 in which the computer program further comprises a fourth code segment to validate the remote system before accepting electronic mail from the remote system.

52. A computer readable medium having embodied thereon a computer program for processing by an intelligent electronic device connected to interact with components of a power system, the computer program comprising:

a first code segment to receive input from power system components used for the distribution or dissemination of electric power in the power system, the input relating to operation of the power system;

a second code segment to send output to the power system to operate a fault protection device when input received from the power system indicates a fault event in the power system; and a third code segment to automatically transmit electronic mail to a remote system through a communication link.

* * * * *